April 30, 1963  F. MASSA  3,088,059
APPARATUS FOR IMPROVING THE LINEARITY
OF ELECTROMECHANICAL TRANSDUCERS
Filed Aug. 24, 1960

INVENTOR:
FRANK MASSA
BY
ATT'Y

United States Patent Office 3,088,059
Patented Apr. 30, 1963

3,088,059
APPARATUS FOR IMPROVING THE LINEARITY OF ELECTROMECHANICAL TRANSDUCERS
Frank Massa, Cohasset, Mass., assignor to Massa Division of Cohu Electronics, Inc., a corporation of Delaware
Filed Aug. 24, 1960, Ser. No. 51,619
6 Claims. (Cl. 317—199)

The present invention relates to means for improving the linearity of electromechanical transducers.

The electromechanical transducer which is embodied in a direct recording oscillograph, as described in United States Letters Patent No. 2,932,776, usually requires that the displacement of the mechanical member, such as the stylus tip of the recording oscillograph, be linearly proportional to the current input to the transducer. Generally, however, the relationship deviates from a straight line in the region near maximum or full scale deflection of the transducer. The deviation is such that the deflection does not increase at a uniform rate with increasing current, but actually the deflection sensitivity is somewhat reduced in the region near maximum displacement of the transducer.

The object of this invention is to improve the linearity of an electromechanical transducer.

It is another object of this invention to provide a simple adjustable means for correcting the non-linearity of an electromechanical transducer.

It is a further object of this invention to provide means for increasing the deflection sensitivity of the mechanical element in an electromechanical transducer near the region of its full scale deflection.

These and other objects of the invention are pointed out with particularity in the appended claims; however, for a better understanding of the invention, reference is made to the accompanying drawings and specifications in which is shown an illustrative embodiment of the invention.

Figure 1:
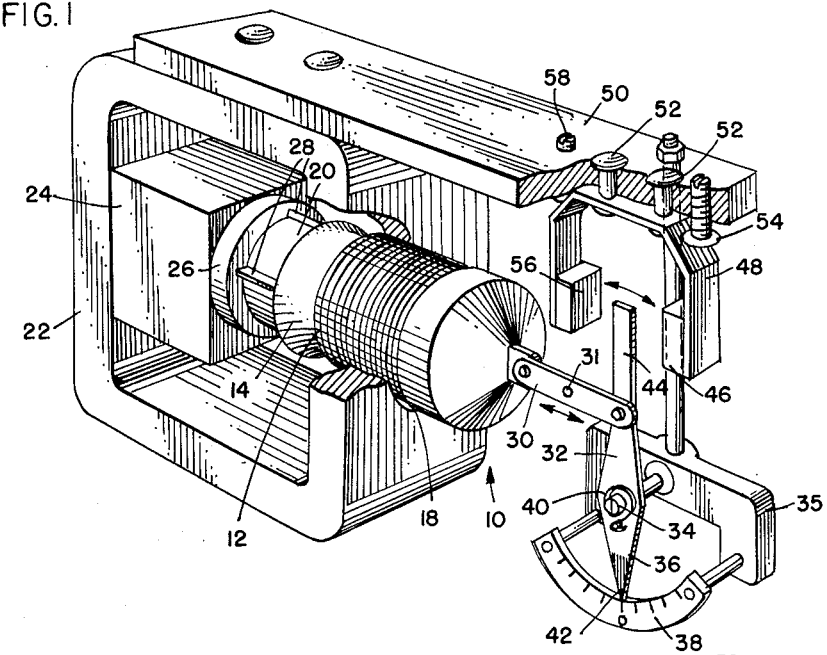
FIGURE 1 is a partially broken-away pictorial view of an electrodynamic transducer and partially shown associated recording and linearity compensating apparatus suitable for use with a direct recording oscillograph.
Figure 2:
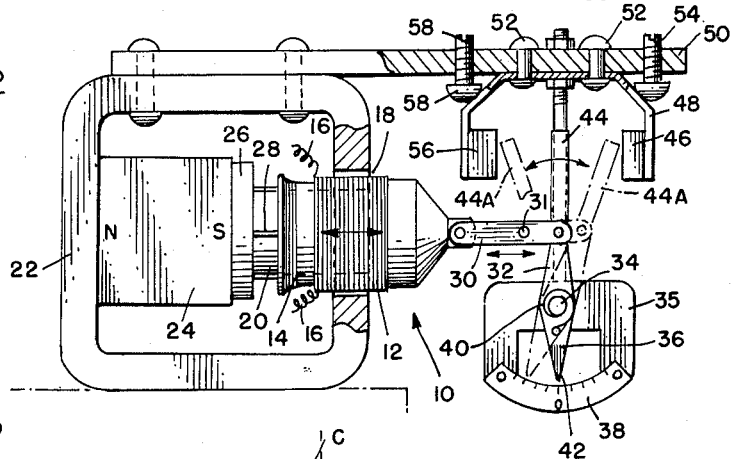
FIGURE 2 is an elevational view of the transducer system and the associated linkage arrangement for improving the linearity of the electromechanical transducer system.

Referring more particularly to FIGURE 1, the basic elements of an electromechanical transducer are illustrated by the force generating means 10 which comprises a coil of wire 12 wound on a cylindrical coil form 14. A pair of leads 16 provide means for connecting the coil 12 to an external source of electric current. The coil form 14 with its coil 12 is mounted in the circular air gap 18 and arranged so that it may move freely along its normal axis. The circular air gap 18 is formed by a cylindrical soft iron pole piece 20 which is concentrically located within a circular hole in the soft iron yoke 22. A permanent magnet 24 and soft iron plate 26 complete the magnetic circuit for the transducer.

The magnet 24, plate 26, and pole piece 20 may be held permanently together by bonding with a suitable cement, by soldering, or by any other attaching method. The coil form 14 may be suspended to move freely in the air gap by providing low friction guides 28 between the pole piece 20 and the inner surface of the coil form 14 such as is illustrated for the moving coil system described in United States Letters Patent No. 2,932,776, dated April 12, 1960, or the coil may be suspended by means of a spider or any other well known method such as used in the construction of dynamic loud speakers.

When an electric current is connected to the leads 16, the interaction of the current through the coil 12 of the magnetic field in the air gap 18 will cause a force to be generated in the coil 12. This generated force is transmitted through the connecting member 30 to one end of a linkage element 32. The element 32 is mounted so that it may rotate about the fixed pivot 34. When translatory forces are applied to the linkage element 32 by the connecting member 30, the free end 36 will rotate; and its displacement may be read on the scale 38. A spring member 40, or any other type of a restoring force element, is mounted between the fixed pivot 34 and the moving linkage element 32 provides the restoring force in the system which determines the sensitivity of the transducer.

In the illustration shown in FIGURE 1 the linearity of the system is indicated by the relationship between the current through the coil 12 and the reading of the displacement of the point or tip 42 over the scale 38. In an actual transducer, such as the direct recording oscillograph described in the United States Letters Patent, No. 2,932,776, the linearity would be measured by the relationship between the current and the displacement of the tip 42 of the recording stylus.

Figure 3:
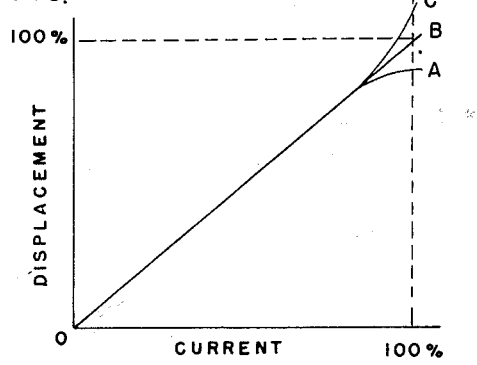
FIGURE 3 is a chart showing the relationship between displacement and current before and after applying the linearity compensating apparatus of my invention.

For an ideal linear system the relationship between the current through coil 12 and displacement of the point 42 over the scale 38 should be a straight line as indicated by curve B in FIGURE 3. In a typical actual transducer, however, the relationship between current and displacement may fall off in the region near maximum displacement as illustrated by curve A. Among the reasons for this non-linearity are included the fact that the magnetic field may be slightly weakened at the extreme ends of the coil 12 travel which in turn causes a reduction in the force generated in the coil 12. Also, there may be non-linearities in the restoring spring 40 which may cause the stiffness to increase at full deflection, thereby causing a falling off in the relationship between current and displacement as indicated by the curve A in FIGURE 3.

It shall be noted that the mechanical pen motor linkage (not shown but illustrated in detail in United States Letters Patent No. 2,932,776) may be connected to the connecting member 30 through the opening 31 or affixed directly to the linkage member 32.

In order to correct the non-linearity as illustrated by curve A in FIGURE 3, this invention utilizes the principle of negative stiffness which is the effect caused when two magnetic surfaces are in close proximity with a magnetic field of attraction existing between them. The effect of such a magnetic attraction is to reduce the effective mechanical stiffness of the transducer system which in turn increases the displacement sensitivity in the region where the magnetic attraction is effective.

The actual embodiment of this invention is illustrated schematically in FIGURE 1.

A magnetic susceptible element or soft iron element 44 is attached to the connecting member 30. As the connecting member 30 is displaced to the dotted position, the iron element 44 is moved to the dotted position 44A. A permanent magnet 46 is secured by cement or other suitable means to spring yoke 48. The yoke 48 is rigidly fastened to a frame member 50 by fasteners 52 and its location is such as to bring the magnet 46 in close proximity to the displaced iron element 44 at its position of maximum displacement, identified by number 44A. The inverted round head adjusting screw 54 is inserted through a tapped hole in the frame member 50 as shown. By turning the screw 54, a fine adjustment is possible in the actual spacing between the magnet 46 and the element 44.

If the position of the magnet 46 is brought too close to element 44, the non-linearity will be over compensated and the relationship between displacement and current will approach the result as illustrated by curve C in FIGURE 3. It is a simple matter to set the adjusting screw 54 until the position of the magnet 46 is such that exactly 100% displacement is produced for 100% current input to the coil 12.

A second magnet 56 is located on the opposite arm of the yoke 48 and a second adjusting screw 58 is arranged to permit the same function when the current in the coil is reversed as was performed by screw 54. By providing independent micrometer screw adjustments at each end of the excursion of the connecting or drive member 30, it is possible to adjust the linearity independently at each end of the coil 12 travel to achieve the optimum linearity characteristic for the transducer.

For the purpose of affording a mechanical mounting structure, the fixed pivot 34 may be pivotally connected to a mounting bracket 35 which in turn is rigidly affixed to the frame member 50.

If the magnetic compensation described in this invention is applied to a specific electromechanical transducer such as, for example, the rectilinear direct writing oscillograph described in United States Letters Patent No. 2,932,776, it will be possible to adjust the positions of the compensating magnets 46 and 56 to obtain exact full scale deflection of the writing pen for full scale input of driving current with a resulting zero error at full scale deflections of the writing pen. More important, by providing independent adjustments at opposite ends of the coil travel, it will be possible to correct for any lack of symmetry in the axial displacement of the coil.

As an alternative embodiment of the invention, the element 44 may be constructed of a permanent type magnetic material and the magnets 46 and 56 may be made of soft iron. This construction can be readily appreciated by one skilled in the art as performing a similar function by reversing the magnetic elements.

While, for the purpose of illustration, the invention has been shown in a particular embodiment thereof, it will be understood that additional embodiments and modifications thereof may be devised without departing from the spirit and scope of the invention as defined by the appended claims.

What is claimed as the invention is:

1. In an electromechanical transducer adaptable for the conversion of electrical current to mechanical displacement, comprising a force generating means capable of being activated by the passage of an electric current, a driven mechanical means, means connecting said force generating means to said driven means, said driven means including an element subject to displacement as a function of the magnitude of the current passing through said force generating means, the displacement of said element being proportional to an increment of said electric current, said displacement being less in the region near maximum displacement of said element than in the region of lesser displacement, means for increasing the deflection sensitivity per increment of current only in the region near maximum displacement of said element to provide uniform displacement of said element for equal increments of electrical current over the operating range of said transducer, said means including a magnetic element adapted to increase the force acting on said driven mechanical means near the region of maximum displacement of said mechanical means.

2. In an electromechanical transducer adaptable for the conversion of electrical current to mechanical displacement, a force generating means capable of being activated by the passage of an electrical current, a driven mechanical means, means for connecting said force generating means to said driven means, said driven means being capable of displacement as a function of the magnitude of said electrical current, the resultant function between the magnitude of said elecrtical current and the magnitude of said mechanical displacement being characterized wherein the resultant function deviates from a linear function in the region near the vicinity of maximum displacement of said driven mechanical means, means for improving the linearity of said resultant function to provide uniform displacement of said driver means for equal increments of electrical current over the operating range of said transducer, said means for improving the linearity of said function comprising a first magnetic member movable by said driven mechanical means and a second magnetic member positioned in relatively close proximity to said first magnetic member only as said driven mechanical means is displaced toward its maximum position.

3. The invention set forth in claim 2 further characterized in that one of said magnetic members is compensatingly adjustable.

4. The invention set forth in claim 2 further characterized in that one of said members comprises a permanent magnet.

5. The invention set forth in claim 2 further characterized in that said second magnetic member is a permanent magnet and is provided with mechanical compensation in order to adjust the position of said magnet.

6. In a transducer for converting electrical current to mechanical displacement, a current actuated force generating means, a linkage connecting said force generating means to a mechanical element capable of displacement as a function of the magnitude of the electrical current supplied to said force generating means, means for increasing the displacement sensitivity of said mechanical element near the region of maximum displacement of said element to provide uniform displacement of said mechanical element for equal increments of electrical current over the operating range of said transducer, said means including a first magnetic element which is displaced by said force generating means and a second magnetic element which is placed in the vicinity of said first magnetic element so that an added force of magnetic attraction is created only near the region of maximum displacement of said force generating means whereby the deflection sensitivity of said mechanical element is increased.

References Cited in the file of this patent

UNITED STATES PATENTS

| | | |
|---|---|---|
| 1,768,979 | Guettinger | July 1, 1930 |
| 2,648,254 | Stimson et al. | Aug. 11, 1953 |
| 2,702,369 | Dreyfus | Feb. 15, 1955 |
| 2,829,319 | McCleskey | Apr. 1, 1958 |